June 8, 1954  H. I. SHRUBSALL  2,680,798
METHOD OF HIGH CURRENT DENSITY ARC WELDING
Filed Dec. 20, 1952
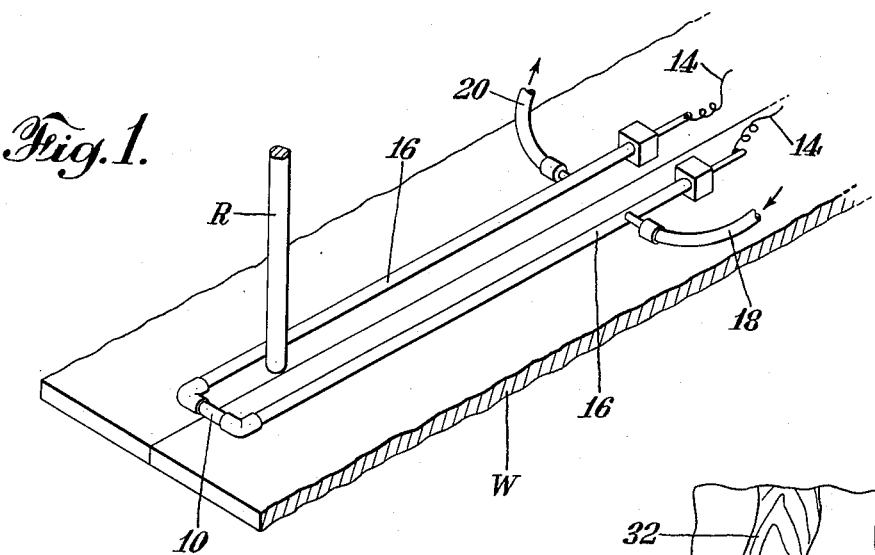
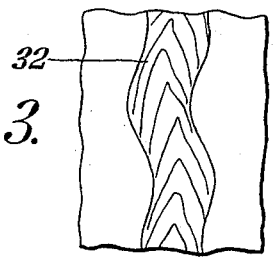
Fig. 3.
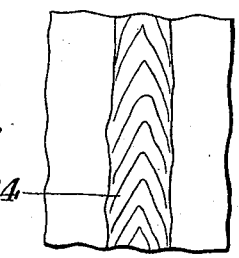
Fig. 4.
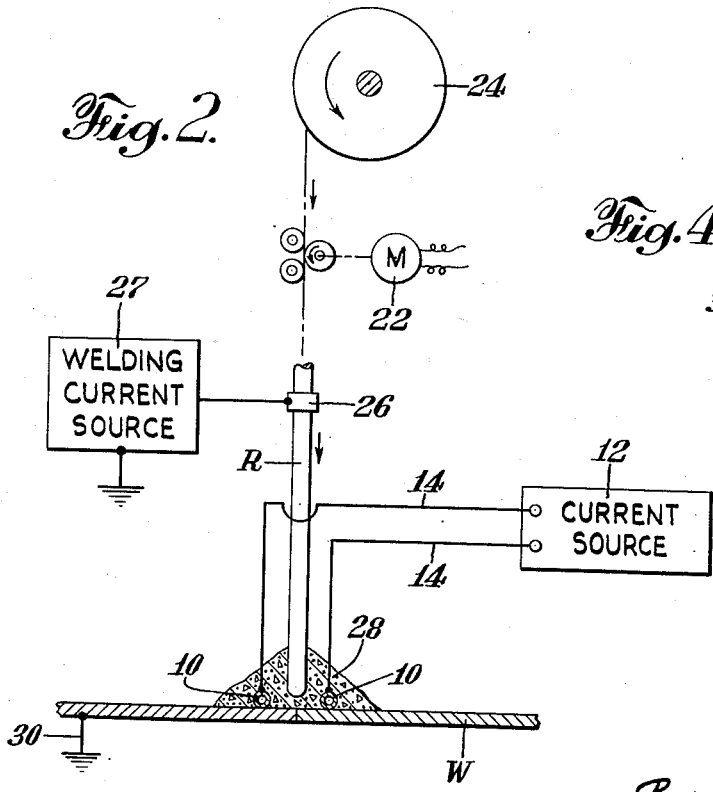
INVENTOR
HARRY I. SHRUBSALL
BY
Barnwell R. King
ATTORNEY

Patented June 8, 1954

2,680,798

UNITED STATES PATENT OFFICE 2,680,798

METHOD OF HIGH CURRENT DENSITY ARC WELDING

Harry I. Shrubsall, Scotch Plains, N. J., assignor to Union Carbide and Carbon Corporation, a corporation of New York Application December 20, 1952, Serial No. 327,083

6 Claims. (Cl. 219—10)

This invention relates to arc welding and more particularly to submerged-melt welding and "sigma" welding in which a relatively stiff arc is used. Submerged-melt welding is disclosed in the patent to Jones et al., No. 2,043,960; and "sigma" welding in the patent to Muller et al., No. 2,504,868. Both types of welding employ relatively high-current density arcs.

A great amount of work has been carried out in attempts to control or counteract adverse magnetic effects in arc welding in general. One magnetic phenomenon, for example, is commonly known as arc "blow," which is a bending or deflection of the arc, and is produced by an unbalanced or unequal concentration of magnetic flux around the arc. Such magnetic flux is generated by the welding current which passes through the electrode and the workpiece, as well as the arc itself. A narrow, peaked weld, frequently porous, is usually associated with a severe "backblow" condition. A slight forward blow usually produces a flat, even weld. If, however, the forward blow is too strong, the weld will become very uneven in appearance.

This problem is often acute in automatic welding (especially when welding with direct current) and has received considerable attention in the past. Most of the proposed solutions require heavy and cumbersome iron-core electromagnets which are designed to travel with the welding action, or to be mounted under the work, with considerable difficulty and expense. The patent to Jones, No. 2,152,194, for example, proposes the use of one or more iron-cored electromagnets which are mounted to travel with the welding action lineally along the work adjacent the path traveled by the welding rod.

The value of auxiliary magnetic fields in inert gas shielded-refractory electrode arc welding of the type disclosed by the patent to Meredith, No. 2,342,086, for example, has been investigated and it is known that a remarkable increase in the lineal speed of welding light-gage stainless steel can be attained by incorporating a small permanent magnet into the gas cup itself. While the arc can be deflected in a forward direction by a magnetic cup in the case of a fairly soft arc, such as those involved in inert gas shielded-refractory electrode arc welding, the metallic arcs, such as those used in submerged-melt and sigma welding, which are relatively stiff, are quite unresponsive thereto. The present invention is concerned with such relatively hard or stiff arcs and their control.

The main object of the invention is to provide a more simple, effective and economical method of and means for eliminating arc wandering, increasing the weld width, controlling the depth of penetration, and decreasing arc deflection in relatively heavy duty arc welding, than has been known heretofore.

This is accomplished by a simple water-cooled conductor in the form of a simple U-loop having its parallel legs arranged on opposite sides of the arc and connected to a suitable relatively high source of alternating current, resulting in a powerful alternating field the lines of force of which are concentrated in a vertical plane passing through the axis of the electrode and the path to be welded by such arc. The current flowing through the loop should be at least half of that flowing through the arc. As a result:

When such loop is energized, any tendency for the arc to wander is eliminated.

The weld width is increased and the weld surface improved.

It is possible to control the depth of penetration of the weld by adjusting the value of the current flowing through the magnetic loop.

The degree of arc deflection backward decreases as the value of the current in the loop increases.

When using the energized loop and welding away from the ground connection, the weld surfaces are smoother than those obtained when welding toward the ground connection.

In the drawing:

Fig. 1 is a fragmentary perspective view of an arc welding set-up illustrating the invention;

Fig. 2 is a schematic view partly in side elevation and partly in section of such set-up; and Figs. 3 and 4 are top plan views of patterns made with and without the invention.

The U-loop 10 comprises a conductor such as a copper pipe in the form of a deep U loop. The two open ends of the U-loop are connected to a current source (A. C. or D. C.) 12 by conductors 14, 14. The U-loop is laid flat on the workpiece W, with the welding electrode R centered between the parallel legs 16, 16 thereof. The latter is provided with cooling liquid, such as water, inlet and outlet connections 18 and 20. The welding electrode R is fed toward the welding zone by conventional rod feed means including a drive motor 22, from a supply reel 24, and through an annular contactor 26 which, with the workpiece W, is connected to a conventional source 27 of welding current (A. C. or D. C.). The welding zone is kept covered with a blanket 28 of conventional granular submerged-melt welding composition during the operation.

Using the illustrated set-up a series of submerged-melt weld deposits were made, welding both away from and toward a ground connection 30, both with and without the energized loop 10. The workpiece was a plate insulated from both the worktable and hold-down clamps (not shown). The loop 10 was insulated from the top surface of the plate W.

The welding conditions used in actual tests were, for example, a welding current of 675 amperes (D. C.—r. p.), an arc voltage of 25-26 volts, a lineal welding speed of 25½ inches per minute, a blanket of 50-grade, 8 by 48-mesh "Unionmelt" (Linde) submerged-melt welding composition, and $\frac{5}{32}$-inch diameter "Oxweld" (Linde) No. 36 welding rod. The strength of the magnetic field was controlled by varying the value of the current flowing in the U-loop 10 from a minimum of 300 amperes (A. C.) to a maximum of 1425 amperes (A. C.). A series of weld deposits were made using similar welding conditions under blankets of 20-, 70-, 80-, 85-, and 90-grade "Unionmelt" (Linde) welding flux of various mesh sizes. For such series, a relatively constant current of 1100 amperes was conducted through the loop. Several welds also were made on 20-gage mild steel plates using a $\frac{1}{16}$-inch overlap at a welding speed of 210 inches per minute, both with and without the magnetic field of the energized loop.

Observations of carbon arcs show very clearly that any tendency for the arc to wander is practically eliminated by the invention. Figs. 3 and 4, for example, show fused carbon arc patterns made with and without the energized loop. As shown in Fig. 3 the bead 32 is wavy due to arc wander, whereas, the bead 34, Fig. 4, is straight by virtue of the beneficial effect of the field of the powerfully energized loop 10.

The weld surface becomes smoother and wider, with a decrease in penetration, as the value of the current in the loop is increased from 300 amperes. An examination of the electrode stubs indicates that the degree of arc deflection also is decreased as the current in the loop is increased. The value of the current flowing through the loop, however, should be not less than about one-half of the value of the current carried by the arc.

The invention provides a marked improvement in weld quality on surface deposits, and it is possible to increase the weld width from $\frac{7}{16}$ to $\frac{11}{16}$ inch by using the energized loop, with no other change in welding technique. For the welding of light-gage materials, flatter welds at higher welding speeds also are made possible by the invention.

While I am unable to explain the phenomenon which accounts for the remarkable improvements in high-current arc welding brought about by my invention in the case of heavy duty arcs, the apparatus is quite simple and inexpensive, and suitable for "sigma" and submerged-melt arc welding. It is light in weight, easy to assemble with the workpiece, and requires little or no maintenance.

I claim:

1. Process of arc welding a workpiece with a relatively stiff arc carrying a relatively high current which comprises applying a relatively powerful field the lines of force of which are adjacent and parallel to such arc by means of a simple conductor in the shape of a U placed on and insulated from the workpiece to form a U-loop about the arc, the legs of which are connected to a suitable relatively high source of current, and conducting current having a value of at least half that of the welding arc through such loop.

2. Process as defined by claim 1, in which said conductor is a pipe, and flowing cooling liquid therethrough during the welding operation.

3. Process as defined by claim 2, in which granular submerged-melt welding composition is heaped on the work over the loop and about the end of a welding electrode, which composition melts during the operation.

4. Process as defined by claim 1, in which the arc and adjacent material are shielded by a suitable gas.

5. Process of arc welding as defined by claim 1, in which the source of current is alternating.

6. Process of arc welding as defined by claim 1, in which the source of current is direct.

References Cited in the file of this patent

UNITED STATES PATENTS

| Number | Name | Date |
| --- | --- | --- |
| Re. 18,221 | Lincoln | Oct. 6, 1931 |
| 2,528,758 | King | Nov. 7, 1950 |